L. H. BAEKELAND.
CONTAINER FOR FOOD PRODUCTS.
APPLICATION FILED OCT. 8, 1909.
957,137.
Patented May 3, 1910.
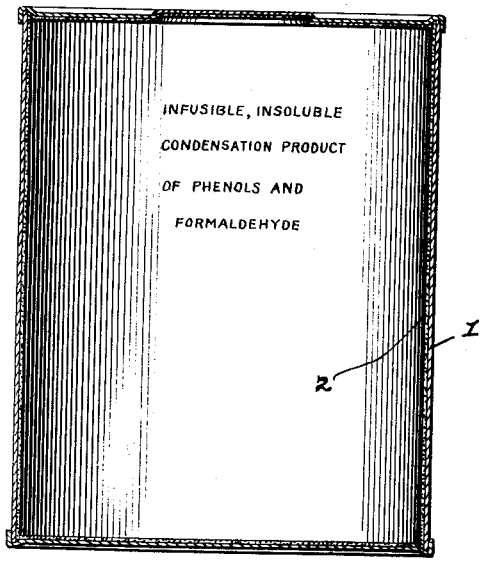

UNITED STATES PATENT OFFICE.

LEO H. BAEKELAND, OF YONKERS, NEW YORK.

CONTAINER FOR FOOD PRODUCTS.

957,137. Specification of Letters Patent. Patented May 3, 1910.

Application filed October 8, 1909. Serial No. 521,890.

*To all whom it may concern:*

Be it known that I, LEO H. BAEKELAND, a citizen of the United States, residing at Yonkers, in the county of Westchester and State of New York, have invented certain new and useful Improvements in Containers for Food Products, of which the following is a specification.

Heretofore it has been proposed to coat metallic containers or boxes with varnishes or lacquers so as to make them more resistant to organic acids or other substances included or developed in some food-products. Shellac varnish, nitro-cellulose lacquers and oil varnishes have been used or proposed for this purpose. The main shortcoming of all these substances is that none of them withstands all the physical and chemical influences to which they may be subjected by the peculiar nature of certain food-products or during the canning process. For instance, none of these substances will withstand at the same time the dissolving action of alcohol in brandied fruits and the influence of vegetable acids, or, again, they will be affected by the heat of the soldering operation during the canning process. In order to obviate these imperfections, I select a substance which withstands all influences to which it may be subjected in a food-container and is not affected by any known solvents; which furthermore withstands chemicals, is infusible and resistant at relatively high temperatures, as well as to steam and boiling water. All these valuable properties I find to be possessed by the so-called insoluble, infusible condensation products of phenols and formaldehyde. But inasfar as these products are insoluble and infusible, I cannot apply them directly in the final condition, and therefore am compelled to resort to a round-about way in order to utilize this material. This is accomplished by starting from the so-called partial condensation products of phenols and formaldehyde which are either soluble or fusible and which after they are applied can, under a further application of heat, be transformed into the final insoluble and infusible condensation products. For this purpose I can use any soluble or fusible condensation product answering the above description, but I prefer more particularly to use a product made in a particular way as follows: 100 parts of carbolic acid are heated with about 90 parts of formaldehyde and about 4 parts of ammonia in a return-condenser until the active reaction is over, after which the separating water is eliminated and the mass is dissolved in alcohol or any other suitable solvent, the alcohol being used in about the proportion of 300 parts, more or less, according to the desired consistency of the solution. The latter is applied to the surface of the metal which has to be protected. This is done by the aid of brushing, by dipping, by spraying, or by any other suitable means. The next operation is drying at a moderate heat, so as to expel the solvent, after which the temperature is gradually raised above 100° C., preferably 130° C., or over. At these high temperatures the transformation into the insoluble, infusible condensation substance occurs rapidly. It is however advantageous to heat in closed vessels under increased pressure; in this way high temperatures can be utilized and the process is considerably shortened and a more homogeneous layer is obtained.

In order to produce better adherence of the protective coating, it is found advantageous to submit the metal to a preliminary "pickling" or acid treatment, so as to start with a clear unoxidized metallic surface. Adherence is also improved by introducing in the protective layer a certain amount of inert filling materials, as for instance pulverized silica, powdered glass, slate dust, asbestos, Cornwall stone, or similar materials.

The protective layer can be applied directly to the containers after they are made or to the sheet metal before it is worked up into containers. Or the partial condensation product may be applied to the sheet metal, then the container may be constructed from the sheet metal, after which the formed container may be submitted to the action of heat, so as to produce the final infusible, insoluble condensation product.

Instead of applying the partial condensation products in solution, they can be applied in any other suitable way, for instance in liquid form or in solid form, by dusting on the powdered partial condensation products, then afterward melting them onto the metallic surface which they shall protect.

Instead of using commercial carbolic acid, I can use pure phenol and, in fact, all homologs of phenol or mixtures thereof which are chemically equivalent to phenol.

Instead of ammonia, I can use other bases or other so-called condensing agents, for instance acids or salts, or dispense entirely with condensing agents which have mainly for object to activate the chemical reaction. In the same way, instead of formaldehyde I can use the polymers of formaldehyde or substances which can engender formaldehyde.

The food-container as above described has the following advantages: It is protected by a substance of unusually high resisting qualities and great hardness. It is much more difficult to scratch than the best lacquers or varnishes. The protective layer will withstand repeated and continuous boiling, not only of water but of dilute acids, alcohol and similar substances. It contains no materials which might be dissolved out in time and which therefore might introduce into the food any objectionable substances. Contrary to resinous matters, this substance does not deteriorate with age nor undergo further transformation process inasfar as it represents the ultimate degree of chemical stability possible; therefore it will not start disintegrating or resinifying or oxidizing as almost all lacquers or varnishes will do. By their very nature the substances which produce the synthesis of the protective material are powerful antiseptics and during the act of formation of the final product, they will therefore contribute to complete sterilization of the food-container.

The accompanying drawing, whereof the figure is a central vertical section, illustrates a sheet metal can 1, provided with an interior protective layer 2, containing an infusible, insoluble condensation product of phenols and formaldehyde.

I claim:—

1. As a new article of manufacture, a container for food-products consisting of a metallic receptacle provided with an interior protective layer including an infusible, insoluble condensation product of phenols and formaldehyde.

2. As a new article of manufacture, a container for food products consisting of a metallic receptacle provided with an interior protective layer including an infusible, insoluble condensation product of phenols and formaldehyde in conjunction with suitable fillers.

In testimony whereof, I affix my signature in presence of two witnesses.

LEO H. BAEKELAND.

Witnesses:
CHARLES H. POTTER,
ETHEL DANIELS.